United States Patent
Fukuhara et al.

(10) Patent No.: US 6,816,980 B1
(45) Date of Patent: Nov. 9, 2004

(54) FAULT TOLERANT, STATE-COMPATIBLE COMPUTER SYSTEM AND METHOD

(75) Inventors: Keith T. Fukuhara, Belmont, CA (US); Alan S. Gin, Foster City, CA (US)

(73) Assignee: Zeronines Technology, Inc., Castle Rock, CO (US)

( * ) Notice: Subject to any disclaimer, the term of this patent is extended or adjusted under 35 U.S.C. 154(b) by 327 days.

(21) Appl. No.: 09/676,699

(22) Filed: Sep. 29, 2000

Related U.S. Application Data

(60) Provisional application No. 60/233,077, filed on Sep. 15, 2000.

(51) Int. Cl.$^7$ ................................................ G06F 11/00
(52) U.S. Cl. .................................. 714/4; 714/4; 714/11
(58) Field of Search .................................. 714/11, 13, 4

(56) References Cited

U.S. PATENT DOCUMENTS

| | | | |
|---|---|---|---|
| 5,812,748 A | * | 9/1998 | Ohran et al. .................... 714/4 |
| 5,951,694 A | * | 9/1999 | Choquier et al. .............. 714/15 |
| 5,974,562 A | * | 10/1999 | Townsend et al. ............. 714/4 |
| 5,987,621 A | * | 11/1999 | Duso et al. ..................... 714/4 |
| 6,038,682 A | | 3/2000 | Norman |
| 6,055,599 A | | 4/2000 | Han et al. |
| 6,058,424 A | * | 5/2000 | Dixon et al. ................. 709/226 |
| 6,069,986 A | | 5/2000 | Kim |
| 6,078,957 A | | 6/2000 | Adelman et al. |
| 6,085,234 A | | 7/2000 | Pitts et al. |
| 6,098,094 A | | 8/2000 | Barnhouse et al. |
| 6,105,122 A | | 8/2000 | Muller et al. |
| 6,122,743 A | * | 9/2000 | Shaffer et al. ............... 713/201 |
| 6,134,673 A | * | 10/2000 | Chrabaszcz ................... 714/13 |
| 6,182,111 B1 | | 1/2001 | Inohara et al. |
| 6,185,695 B1 | * | 2/2001 | Murphy et al. ................. 714/4 |
| 6,192,483 B1 | * | 2/2001 | Moiin et al. .................... 714/4 |
| 6,199,069 B1 | | 3/2001 | Dettinger et al. |
| 6,216,051 B1 | | 4/2001 | Hager, III et al. |
| 6,223,231 B1 | | 4/2001 | Mankude |
| 6,247,141 B1 | | 6/2001 | Holmberg |
| 6,292,905 B1 | * | 9/2001 | Wallach et al. ................. 714/4 |
| 6,304,967 B1 | | 10/2001 | Braddy |
| 6,539,494 B1 | * | 3/2003 | Abramson et al. ............. 714/4 |
| 6,553,401 B1 | * | 4/2003 | Carter et al. ................. 709/200 |
| 2002/0042818 A1 | | 4/2002 | Helmer et al. |
| 2003/0014526 A1 | | 1/2003 | Pullara et al. |

FOREIGN PATENT DOCUMENTS

| | | | |
|---|---|---|---|
| WO | WO 98/54887 | * | 12/1998 |

OTHER PUBLICATIONS

Davis, Scott H., Digital Clusters For Windows NT, printed from the Internet: http://www.microsoft.com/win32dev/base/ntcluwp2.htm, Feb. 1995, 10 pages.

Jander, Mary and Heywood, Peter, Cisco Touts Storage–Over–IP Project, printed from the Internet: http://www.lightreading.com/document.asp?site=lightreading&doc—id=36429, Jul. 2, 2003, 3 pages, Light Reading, Inc.

* cited by examiner

*Primary Examiner*—Scott Baderman
*Assistant Examiner*—Joshua Lohn
(74) *Attorney, Agent, or Firm*—Dorsey & Whitney LLP

(57) ABSTRACT

A fault-tolerant, state-compatible computing system and method have a user interface and a data center. The user interface accesses a first network, and the data center is connected to the first network by a plurality of communication links. The data center includes an extreme server; a plurality of application servers capable of running at least one application; and a second network having two or more communication links between the extreme server and the application servers. Using the communication protocols of the first network, the user interface is able to operate a first application executing on a first application server; and the extreme server maintains a second application executing on a second application server in a state-compatible condition to be used in the event that the user interface is no longer able to operate the first application.

14 Claims, 2 Drawing Sheets

FAULT TOLERANT, STATE-COMPATIBLE COMPUTER SYSTEM AND METHOD

This application claims priority under 35 U.S.C. §119(e) from provisional patent application Ser. No. 60/233,077 filed on Sep. 15, 2000.

FIELD OF THE INVENTION

The present invention relates to a system and method for providing redundant computing, and more specifically, to a system and method for providing a plurality of state-compatible computers.

BACKGROUND OF THE INVENTION

Throughout the history of computing, it has been desirable to develop systems for reliable data processing. In other words, it is desirable to design a computing system that can prevent the loss of data, and can recover to a known state when a failure occurs.

Reliable Data Storage

One method of fault recovery is a backup, namely, storing all of the computer's data and programs on another media so that in the event of a failure, the computer can be restored to the state of the last backup. While almost every computer system with mission critical data is backed up, the use of backups for fault recovery is fraught with imperfections.

One method of making a backup is to close off access to the data being backed up, to copy all of the data to some form of mass storage, and then to again permit access to the now-backed up data. This is referred to as a full backup. A full backup made in this way, obviously, requires that for some period of time, namely, the time it takes to back up the computer, all users of the computer are denied access. For safety, the media on which the full backup is stored would preferably be transmitted or stored at a remote location.

One drawback of the full backup method is that the users may be denied access at times that are inconvenient. Another drawback results from the fact that in the event of a failure, all data created since the last full backup is lost. Thus, the administrator must constantly choose between the "cost" of lost data on the one hand, and the frequency of backing up the computer and the time required to backup the system (during which users will be blocked) on the other; constantly trading one against the other. Furthermore, in the event of a failure, all of the users must stop using the system, then the most recent backup copy must be located, retrieved and restored. Then the users may resume using the system, but all of their data created since the last full backup is lost.

A modification on the full backup theme is making periodic full backups, and between the full backups, making incremental backups of the data that changed since the previous full or incremental backup. Since the incremental backup generally requires substantially less time to perform than the full backup, the users are blocked from access for a shorter period. Despite this, the users are still blocked for a time from access, but a significant drawback arises in restoring the data, because an ordered "set" of tapes now must be located, retrieved and restored in the precise order they were produced.

Another technology designed to decrease the computer's downtime due to a fault is the RAID storage array. A RAID storage array provides fault tolerance in that if a hard drive in the array fails, it can be removed and automatically rebuilt. More advanced RAID arrays include a spare, and begin to build the spare as a replication of a disk that is predicted to fail. Using certain criteria, drives can often be replaced long in advance of any actual failure. Moreover, the RAID array can "hot swap" meaning that a failed drive can be removed even when the system is running, thus preventing downtime due to a component failure. Despite its abilities, however, RAID arrays have a single point of connection, and thus are vulnerable to failing as a whole.

Another technology that prevents the single point of failure is mirroring. A mirrored drive has a counterpart drive that is constantly fed the same transactions, permitting the mirroring drive to remain an identical image of the mirrored drive. In the event that the mirrored drive were to fail, the mirroring drive can be used instead. Mirroring does present drawbacks. For example, where the two mirrored drives disagree and neither has apparently failed, there is no RAID-like redundancy to arbitrate the data inconsistency. Of course, it may be possible to mirror RAID arrays. Even so, if the host computer fails, the storage unit may have preserved a mid-operation state from which the host computer cannot resume.

A newer technology trying to address some of these drawbacks are systems that use mirrored drives. The system periodically interrupts the mirror function while it creates a backup of the mirroring drive. When it is complete, it uses a replication technique to restore the mirror relationship. Vendors such as Hitachi, EMC and IBM have data storage products that provide for synchronous and asynchronous replication and mirroring. During the period that the mirror relationship is broken, however, the system still has a single point of failure, and is subject to data loss.

Accordingly, while each of the foregoing technologies provides varying levels of cost and reliability for data storage, each have substantial drawbacks, including causing access denial and delay after failure, having a single point of failure, and/or preserving a state from which a restarted computer cannot resume.

RELIABLE HOSTING

As many techniques have come about for supposed reliable data storage, many have come about that purport to provide reliable computing. The problem of reliable hosting deals with the incident when the host computer fails. Reliable hosting falls generally into two main categories of techniques, namely failover and clustering.

The technique of failover is accomplished by having two generally identical computers, having only one use its operational power. If that one fails, the second computer takes over, ostensibly from where the first left off. This event is known as failover.

The technique of clustering, on the other hand, is accomplished by having multiple machines, each machine in the cluster performs its individual tasks (sometimes the same tasks), but each has additional capacity to handle the tasks of one or more failed machines in the cluster. While clustering can prevent downtime from a failure because other processing power can be almost immediately substituted for the system that went down, it does not inherently failover—meaning that the applications on the failed component need to be restarted on another component, and thus, some data is usually lost.

There are also some systems that combine features of failover and clustering systems.

In one hybrid failover/clustering architecture, two machines are used, and they must be and remain in substantially identical states—in other words, not only the disks must be mirrored, but the memory as well. Such a system is very costly, and requires a master controller to operate. One example of such a failover system is called the IBM Sysplex. The Sysplex architecture has a master controller connected to two identical computers. The two computers synchronize to the master controller's clock (or heartbeat). As memory is changed in one machine, it gets time-stamped and shipped to the other. The master controller must therefore arbitrate memory locks and facilitate the transfer. Such a system, of course, still has a single point of failure, namely, the master controller.

Another technique designed to provide reliable hosting is the DEC VAX shared disk architecture. A number of VAX computers share a storage system. This architecture allows for processing scalability as well as some amount of failover redundancy, for example, because a task has access to the same data when it is run on any machine in the cluster.

A major drawback of clustering is that both the application running in the clustered environment, and the operating system need to be cluster-aware and need to behave in certain manners dictated by the cluster.

Today, many operating systems are cluster-aware and can also provide one form or another of failover, for example, Novell, HP-UX and IBM AIX can all have a cluster with failover between identical computer systems. Still other proprietary systems exist that provide some type of clustering and/or failover, including an IBM product called NUMAQ (which had been originally developed by Sequent), where processes are distributed over multiple processors, VIA, also known as Virtual Interface Architecture, and Wolfpack, a Microsoft product.

The effect of a system failure at many large companies and banks would be catastrophic. It has been suggested that it would take many organizations one, two or more days to recover from a significant failure, if such recovery were even possible. There are presently no systems that can provide clusters with failover between non-homogenous computing systems. Moreover, there is a need for a computing environment that has a user-selectable reliability.

SUMMARY OF THE INVENTION

A fault-tolerant, state-compatible computing system and method have a user interface and a data center. The user interface accesses a first network, and the data center is connected to the first network by a plurality of communication links. The data center includes an extreme server; a plurality of application servers capable of running at least one application; and a second network having two or more communication links between the extreme server and the application servers. Using the communication protocols of the first network, the user interface is able to operate a first application executing on a first application server; and the extreme server maintains a second application executing on a second application server in a state-compatible condition to be used in the event that the user interface is no longer able to operate the first application.

DETAILED DESCRIPTION OF THE PREFERRED EMBODIMENT

Figure 1:
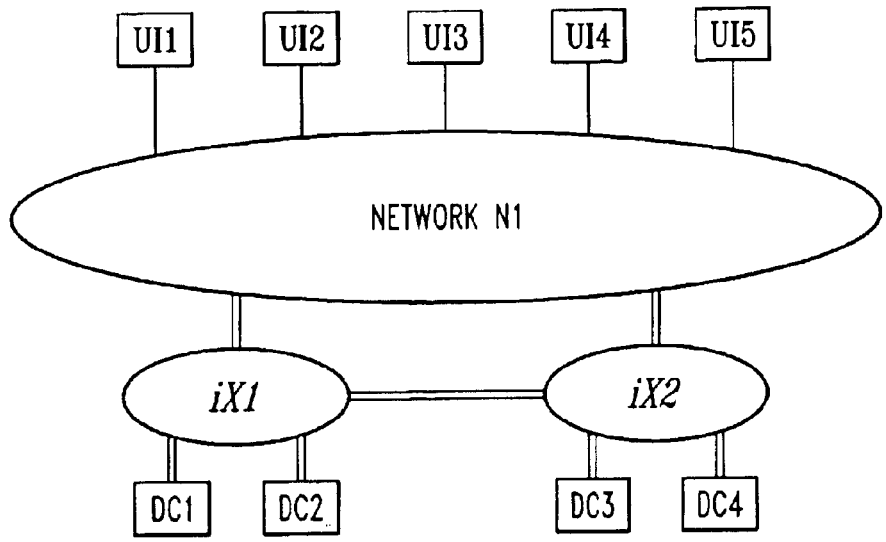
FIG. 1 shows a high level block diagram of a minimal embodiment of the present invention.

FIG. 1 shows a block diagram of a minimal embodiment of the present invention, including essential aspects. The system is designed to scale well beyond the size shown here. Five user interfaces UI1–5 are shown.

The user interfaces UI1–5 may be operated on any computing platform, including, without limitation, computers, personal computers, handheld computers, portable computers and wireless devices. Each of the user interfaces UI1–5 are connected to network N1. The network N1 can be any network, whether such network is operating under the Internet protocol or otherwise. For example, network N1 could be an X.25 network, or even a BlueTooth network. In a preferred embodiment, network N1 is the Internet.

Any connection suitable to transmit data from the user interfaces UI1–5 to network N1 may be utilized. Such connections may include telephone line connections, DSL, Cable Modem, T1, fiber connections or any other type of wired or wireless connection.

FIG. 1 shows network N1 redundantly connected to two private regional networks iX1–2. The private regional networks iX1–2 may be any type of network. In a preferred embodiment, the private regional networks iX1–2 are high speed Internet protocol networks, but are not the Internet. The private regional networks iX1–2 may span a regional area and redundantly connect to multiple data centers DC1–4 located within a region. The configuration shown presents private regional network iX1 connected to two data centers DC1–2, and private regional network iX2 connected to two other data centers DC3–4.

The configuration shown in FIG. 1 also presents a redundant connection between the two private regional networks iX1–2.

While the configuration shown presents two private regional networks iX1–2 and 4 data centers DC1–4, the number of private regional networks iX1–2 and the number of data centers DC1–4 is designed to be flexible and may be easily varied by those skilled in the art.

Application software and other software (not shown in FIG. 1) may be operated at a data center DC1–4 from a user interface UI1–5. To operate application software, the user interface establishes a connection over the network N1 by routing to a private regional network iX1–2. In a preferred embodiment, the user interface UI1–5 routes to a private regional network iX1–2 using the IP address of the private regional network iX1–2. The private regional network iX1–2 then routes the user to a data center DC1–4, where the user's application is operated.

Figure 2:
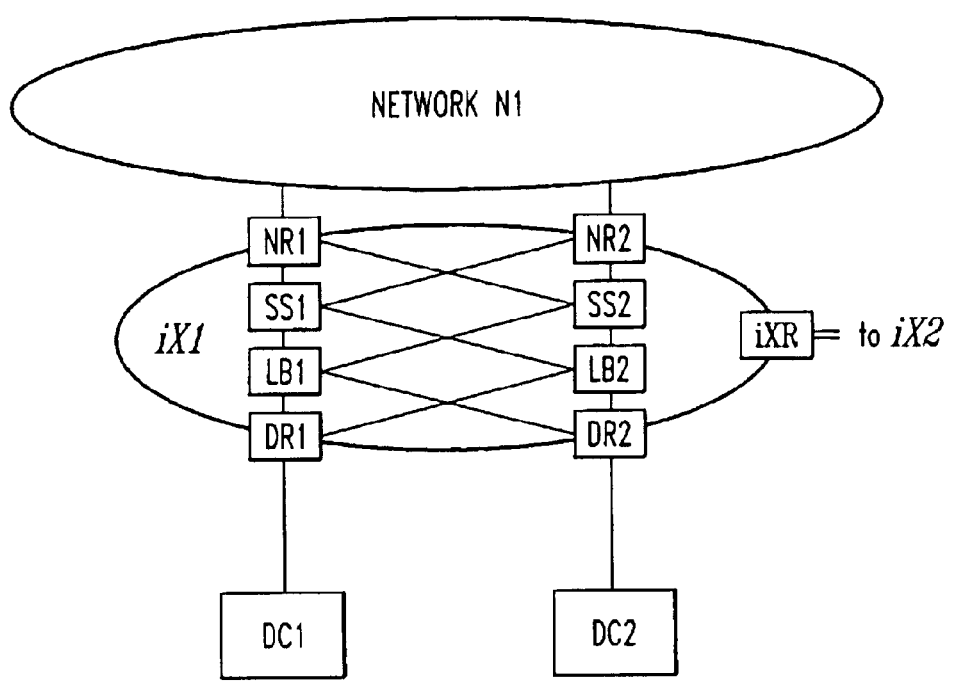
FIG. 2 shows a more detailed block diagram of a private regional network according to the present invention.

Turning now to FIG. 2, for illustrative purposes, private regional network iX1 is shown in more detail. The private regional network iX1 may provide redundancy in connection, security and load balancing for the fault-tolerant system of the present invention. Each of these may also be provided by private regional network iX2 shown in FIG. 1, but not detailed in FIG. 2. The private regional network iX1 is preferably run over a high speed Internet protocol network in a geographically local region, up to, for example, a 40 kilometer radius. The geographical limitations are due to limitations found within the available hardware and communications protocols, and as such limitations decrease within the available equipment, so too will the radius of the private regional network iX1.

The private regional network iX1 (and iX2 which is not shown in FIG. 2) preferably comprise:

two or more network side routers NR1–2;
one or more security server SS1–2;
one or more load balancing server LB1–2;
two or more data center side routers DC1–2; and
one or more inter-network router iXR.

As was mentioned above, in a preferred embodiment, the connection between the network N1 and the private regional network iX1 is redundant. Accordingly, each of the network side routers NR1–2 provide a point of connection to the network N1 for the private regional network iX1. In a preferred embodiment, for security reasons, addressing within the private regional network iX1 is done using addresses that cannot be routed on the network N1. For example, an Internet protocol address in the form 10.x.x.x will not route on the Internet and would be a suitable addressing scheme for the private regional network iX1.

Once a connection from a user interface UI1–5 is received by the network side router NR1–2, it is passed to a security server SS1–2. In the configuration shown, either network side router NR1–2 can route the connection to either security server SS1–2. As will be apparent throughout the discussion, to provide fault tolerance, it is preferable to have multiple paths upon which each connection could traverse for each required service.

When a connection is received by a security server SS1–2 the connection is authenticated. Such authentication is well known in the art. If the connection does not authenticate, it is terminated. If it does, the security server SS1–2 passes the connection to a load balancing server LB1–2. Again, as can be seen in FIG. 2 multiple paths are provided.

The load balancing server LB1–2 determines the destination data center for the connection. The load may be balanced between the data centers DC1–2 in accordance with predetermined and/or dynamic characteristics of the data centers DC1–2, including, without limitation, the connection's path within the private regional network iX1 and from the private regional network iX1 to the data centers DC1–2, and the present load and load characteristics of the data centers DC1–2. Once the load balancing server determines the destination data center DC1–2 for the connection, it sends the connection to the corresponding data center side router DR1–2.

A long haul connection is also available, via the inter-network router iXR. In a preferred embodiment, this connection may be used by any service or application to obtain similar or differing services or applications from remote systems.

Figure 3:
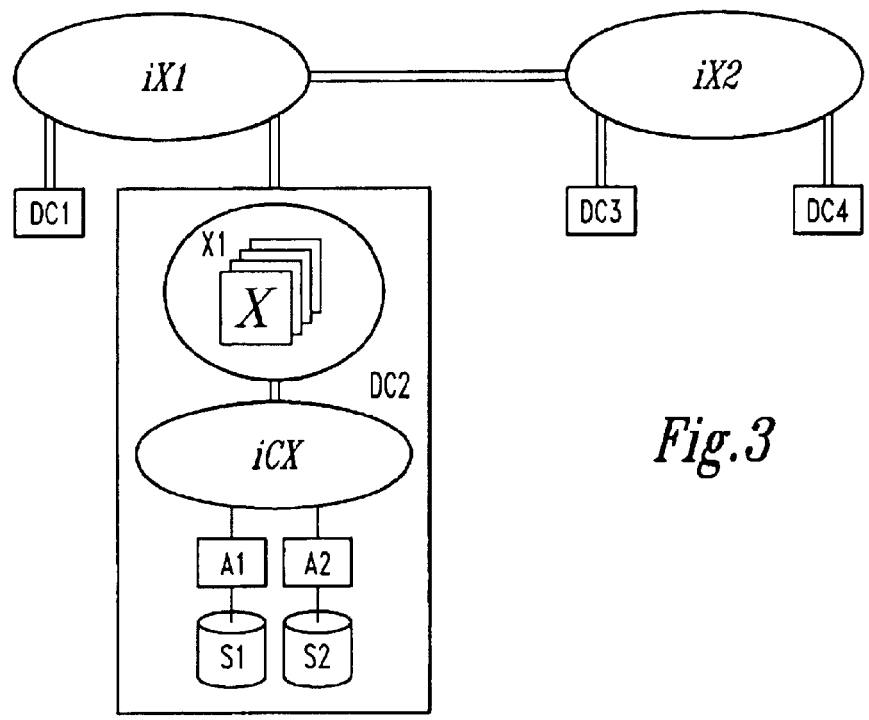
FIG. 3 shows a more detailed block diagram of a data center according to the present invention.

Turning now to FIG. 3, for illustrative purposes, a more detailed view of a data center DC2 is shown. The data center DC2 has a connection to the private regional network iX1. In a preferred embodiment, the connection between the data center DC2 and the private regional network iX1 is preferably redundant. The data center DC2 (and DC1, DC3 and DC4 which are not shown in FIG. 3) preferably comprises:
an X-server cluster X1;
a private center-wide network iCX;
two or more application servers A1–2; and
two or more data servers S1–2.

The X-server cluster X1 is a cluster of X-server (or "extreme" server) computing systems known in the art and operating specialized application software, preferably cluster-aware application software, that enables the connection to a single user interface to be operated, in parallel, on one or more application servers A1–2. The functionality of the X-server computing systems comprising the X-server cluster X1 are discussed in more detail in connection with the discussion of FIG. 4, below.

The X-server cluster X1 includes two or more X-server computing systems. The design of the X-server cluster X1 is as a failover cluster of X-server computing systems, thus, in the event an X-server computing system has failed, another X-server computing system can take over its tasks. Although under some complex computing environments, such a failover cluster would be quite elaborate, the functionality of the X-server computing system, as discussed in more detail below, is limited to screen scraping and providing an interface to two or more application servers that are hosting the application itself. Accordingly, in the event of a failure, none of the application's computing states is lost.

The X-server cluster X1 is connected to the private center-wide network iCX. The private center-wide network iCX performs the same functions within a data center DC1–4 as the private regional network iX1–2 provided for the region—namely, redundancy, security and load balancing. These functions are preferably carried out, in the private regional network iX1–2, by a plurality of routers, security servers and load balancing servers, all not shown in FIG. 3. The load balancing servers (not shown) balance the load from connections of user interfaces UI1–5 between the two or more application servers A1–2. The application servers A1–2 may be any type of computing platform that is capable of running the desired applications, for example the application servers A1–2 may be, for example, a non-cluster-aware computer running under an operating environment such as Windows NT, IBM 390, Unix or Linux.

Application servers A1–2, in turn, are optionally connected to storage servers S1–2, respectively. Each of the storage servers S1–2 is a database server like, for example, an Oracle server.

Figure 4:
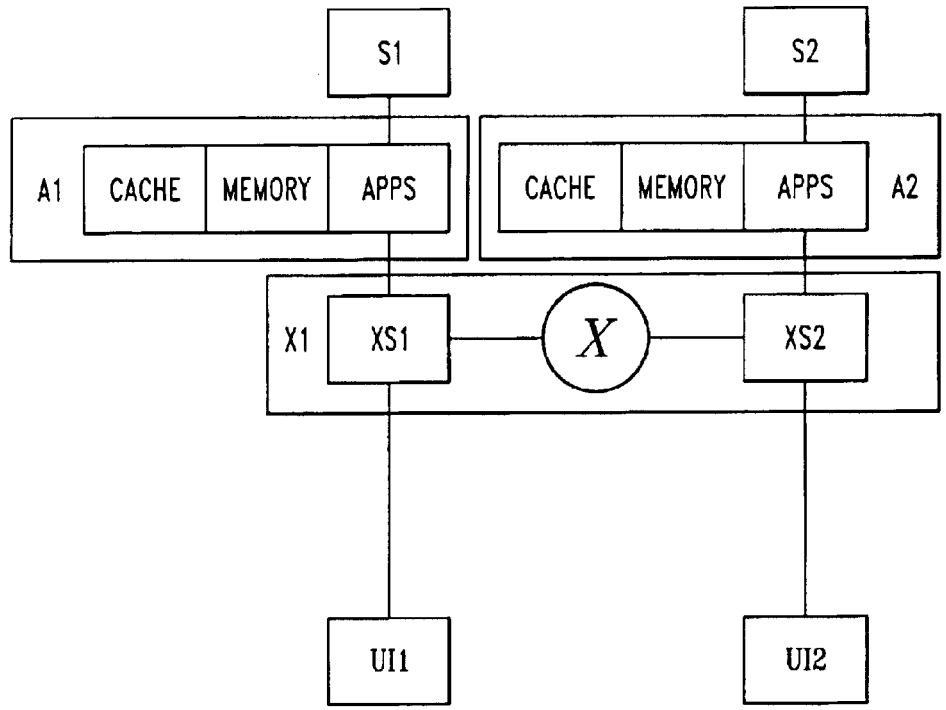
FIG. 4 shows a block diagram of logical connections between various components according to the present invention.

FIG. 4 shows a block diagram of a minimal embodiment of the present invention, including all the essential aspects. The system is designed to scale well beyond the size shown here. FIG. 4 shows a user interface U1–2 logically connected to the screen scraper XS1–2 of an X-server computing system X1. The screen scraper XS1–2 itself is also logically connected to an application Apps on application server A1–2, and to an X-engine X. In addition to operating the application Apps, application server A1–2 also has memory Memory and cache Cache. The application servers A1–2, as is well known, are further connected to storage servers S1–2, respectively.

The system of the present invention contemplates the operation of a "screen" or "form" based application program being operated over a preferably redundant connection routed to an X-server cluster X1 from a user interface UI1–5.

EXAMPLE

As a simple example of the present invention consider the case where an instance of an accounting software package is desired by a user using a user interface U1. The request for operation of the accounting software package is routed, as described above, to an X-server cluster X1, and delivered to a particular X-server computing device X. In particular, the incoming request is received by a screen scraper XS1. The screen scraper forwards the request to invoke the accounting software package both to the application server A1 and to the X-engine X. The application server A1 invokes the application.

At the same time, the X-engine X of the X-server computing device X may, on the basis of a variety of criteria that will be discussed in more detail below, decide to invoke a second instance of the accounting software package on application server A2. It does not matter whether the application servers A1–2 are identical computer systems, or whether they are running similar or identical operating systems, provided that each is able to run the requested software application, in this example, an accounting software package. Moreover, note that the application servers A1–2 need not be cluster aware, nor need they be aware of the existence of the other, or the interposition of the plurality of networks (N1, iCX and iX) between the application servers A1, A2 and the user interface U1.

The invocation of the accounting software package on the application server A2 is done via the screen scraper XS2. The output from the screen scraper XS2 to the application server A2 to invoke the accounting software package is the same in all material respects as the output from the first screen scraper XS1 to the first application server A1.

Once the accounting software package is invoked on the application server A1, the output of the initial screen, for example, a sign-on screen is transmitted from the application server Al back over the same connection from which the application server A1 received the invocation instruction. Similarly, the sign-on screen is transmitted from the application server A2 over its same connection. In each case, the sign-on screen is received by the screen scraper XS1–2.

The second screen scraper XS2 returns the screen toward the origin of its instruction, namely, to the X-engine X, while the first screen scraper XS1, returns the screen to the user interface UI1 (over the intervening networks and devices, not shown). Thus, the user interface UI receives the sign-on screen.

Upon completing the sign-on screen, a user typically "submits" the completed form back to the accounting software package. When the completed form is received at the first screen scraper XS1, the form is scraped; that is, processed to obtain the data inputted to the form, and the data sought by the accounting software package is transmitted by the screen scraper XS1 both to the first application server A1 and to the X-engine X. The X-engine X again forwards the data to the second screen scraper XS2, which in turn forwards the data to the second application server A2, and so on in this fashion the accounting software package or other application is operated.

It is important to note that this novel technique may be applied to map data between application software products that differ. Using the accounting software package example, two different accounting software packages from two different vendors could be employed. If each of the two accounting software packages are provided with the same information, the posting to, for example, the general ledger should be consistent.

Using this technique has many advantages over prior systems. In the past it has been a great problem to move from one accounting system to another. Traditionally, each accounting software package would have to be provided separate inputs by separate operators. Subsequently, the output of the two packages would be compared with each other. Then, after some period of time, when the new accounting software package could be "trusted," the older accounting software package would be taken off-line, and only then would the double entry cease. Using the novel system and method disclosed herein, the two accounting software packages can be run in parallel automatically for as long as desired, without redundancy in data entry.

In addition, when switching to a new accounting software package, a company that, for example, operates three instances of one accounting software package for fault-tolerance, could initially replace one of the three instances with the new package, and, over time, replace the other two instances. Or it could decide to keep both running indefinitely to reduce the risk of undetected logic errors or problems with one software package.

The operation with two different accounting software packages would also reduce risk of undetected logic errors or other problems because any discrepancy between the results of the two software packages would make the existence of an error or other problem known. That same error, however, may not result in a discrepancy between two copies of the same accounting software package. In other words, if the two accounting software packages are processing the same data, it is assumed that the outputs are the same.

While one embodiment of the novel invention presented is in connection with an accounting software package, it will be apparent to one of skill in the art that the novel system and method are equally applicable to, and can be used in connection with, a wide variety of software or computing solutions.

DATA CENTER FAULT TOLERANCE

Notably, the state of each of the application servers A1–2 is identical at all relevant times. In other words, if the first application server A1 were to fail at any point, the second application server A2 could take over. The present invention contemplates such a switchover to take place using any of a variety of different mechanisms, including, by having the first screen scraper XS1 notify the X-engine X of the timeout or failure, and having the X-engine X instruct the second screen scraper to transmit directly back to the user interface UI1 (over a connection that is not shown in FIG. 4). Alternatively, the X-engine X could act as an intermediary, and continue to move the data from the second screen scraper XS2 to the first screen scraper XS1, while the first screen scraper XS1 could maintain its connection to the user interface UI1.

Since the X-server computing systems are in a failover X-server cluster X1, any failure within the X-server computing system XS1 would result in a failover to another X-server computing system XS1 within the X-server cluster X1.

Since a redundant and load balanced connection is used between the X-server cluster X1 and the application servers A1–2, a failure of that connection would result only in a rerouting of the connection. Moreover, even if the failure prevented an application server A1–2 from communicating over the network, this would have the same effect as a failure of the application server A1–2, which will result in another application server A1–2 taking its place in processing.

INTER-DATA CENTER FAULT TOLERANCE

The two application servers A1–2 referred to in the example given above were located within the same data center DC1–4. This, however, is not necessary. An X-server cluster X1 can, in real-time, solicit the services of an application server located in another data center DC1–4. In other words, two application servers located in different data centers DC1–4 within a region can operate the same application software in parallel, and in the event of a failure anywhere within the data center DC1–4, can provide an immediately available, geographically remote, state-ready system that can take over processing on-the-fly.

A very high speed network is required to support such activity between regional, but geographically remote, data centers. Today, data rates as high as 17 MBps (mega-bytes per second) can be achieved within a radius of approximately 40 kilometers using ESCON over fiber-optics. Moreover, data rates as high as 1 gigabit are achieved using a Storage Area Network (SAN) over fiber-optics, such solutions are available from vendors such as Hitachi, EMC and IBM. Today, Optical Carrier ("OC") services, e.g., OC-192, can provide up to 9.9 Gbps (gigabits per second), or what is sometimes referred to as 10 GbE (10 Gigabit Ethernet). OC services may be provided over the SONET physical layer, a description of which can be found in the specification thereof Even higher data rates over similar or larger geographical regions are expected to be possible in the near future using such advanced technologies as dense-wave division multiplexing and/or a multi-frequency fiber-optic transmission techniques.

INTER-REGION FAULT TOLERANCE

Due to the long haul distances between regions, it is hard to guarantee that an application server in a data center belonging to a remote region is an immediately available and state-ready system. As will be apparent to one of skill in the art, a remote application server can be implemented to be state-ready with just small delays. To accomplish this, the same technique is applied as between inter- or intra-data center application servers; however, there needs to be accommodation for the distance, and therefore delay in transmissions.

SCALABILITY

The invention as hereinabove described has been described as having one redundancy for each failure. Accordingly, in the event of a failed application server, there is another application server to take over. The invention, however, provides a mechanism for user-definable fault tolerance, in other words, where more fault tolerance is desired, any number of application servers, at any number of data centers, in any number of regions, can be employed to run the same application.

For example, if the chance of failure of a given application server were 1 in 10 in any given day, that is a 90% service level, then by operating two application servers, the chance of failure in any give day becomes 1 in 100, or a 99% service level. Similarly, if the chance of a total data center failure were 1 in 100 in any given day, or a 99% service level, then by operating in two data centers, the chance of failure becomes 1 in 10,000, or a 99.99% service level. These numbers, of course, are intended only to provide an example, and are not intended to be realistic approximations of actual service levels.

The present invention is intended to permit great flexibility in its implementation to permit the identification and allocation of the risk of failure. Moreover, it is contemplated that a user may self-select the desired service level, and having done so, the system will spawn sufficient applications to achieve the desired service level. For example, to a bank, to have data centers only in the San Francisco region where an earthquake is a serious risk may represent a contingent liability that is simply too large a risk to take. In such an event, the bank could elect to have a geographically diverse system, and the service provider could charge the bank accordingly. Some small local business which, heretofore, were using daily tape backups, may now find redundancy within a single data center a cost acceptable solution, which, in combination with the daily backups, substantially reduces the chance of downtime that results from system failure. Many algorithms for adjustment of the data risk are possible and may be created by those skilled in the art.

Also of concern is the reliability after a failure. In other words, where an application is operating on each of three application servers that have a 1 in 10 chance of failure, the application has a 99.9% service level. Where a failure occurs, the application is thereafter running on only two application servers, and thus has only a 99% service level. In a preferred embodiment, a third instance of the application would be spawned, thus returning the application to a 99.9% service level.

It is notably that the risk of failure does not always remain static. For example, due to changing conditions, as varied as an unexpected storm or a report of a bug in a version of an operating environment, the risks associated with each application server and data center are dynamic. Accordingly, in a preferred embodiment, the operational service level is reviewed either periodically, or preferably when affected by a change in risks, and, where appropriate, the system takes the actions necessary, such as moving the application from one application server to another, or creating a new instance of the application, to ensure the service level.

As mentioned above, application servers running a particular application need not be homogenous. As an example, an accounting software package can be run under Windows NT on a first application server and under Unix on a second application server. At the same time, each of the first and second may be running many other applications which need not be the same. For example, consider an environment with four users and four application servers. Each user is running one application, and each user desires to run the application on three servers. There are numerous different operational configurations which will accommodate these request. The following TABLES 1, 2 and 3 represent three possible operational configuration:

TABLE 1

|        | Server 1 | Server 2 | Server 3 | Server 4 |
|--------|----------|----------|----------|----------|
| User 1 | Running  | Running  | Running  |          |
| User 2 | Running  | Running  | Running  |          |
| User 3 | Running  | Running  | Running  |          |
| User 4 | Running  | Running  | Running  |          |

In this configuration each server is running an identical group of processes. Server 4 remains unused.

TABLE 2

|        | Server 1 | Server 2 | Server 3 | Server 4 |
|--------|----------|----------|----------|----------|
| User 1 | Running  | Running  |          | Running  |
| User 2 | Running  |          | Running  | Running  |
| User 3 |          | Running  | Running  | Running  |
| User 4 | Running  | Running  | Running  |          |

Each of the servers has a balanced load, and is running some grouping of applications that differs from every other server.

TABLE 3

|        | Server 1 | Server 2 | Server 3 | Server 4 |
|--------|----------|----------|----------|----------|
| User 1 | Running  | Running  | Running  |          |
| User 2 | Running  | Running  | Running  |          |
| User 3 | Running  | Running  |          | Running  |
| User 4 | Running  | Running  |          | Running  |

In this configuration, the load appears unbalanced, however, Some of the servers, such as servers 1 and 2 may be larger capacity machines, capable of performing greater amounts of processing, and thus may actually be under-utilized relative to servers 3 and 4.

While the foregoing describes and illustrates the preferred embodiment of the present invention and suggests certain modifications thereto, those of ordinary skill in the art will recognize that still further changes and modifications may be made therein without departing from the spirit and scope of the invention. Accordingly, the above description should be construed as illustrative and not in a limiting sense, the scope of the invention being defined by the following claims.

What is claimed is:

1. A fault-tolerant, state-compatible computing system, comprising:
   a user interface connected to a wide-area network;
   a data center comprising:
      an extreme server having at least one screen scraper;
      a plurality of application servers capable of running at least one application; and
      a local network having two or more communication links between the extreme server and the application servers;
   a regional network having at least two communication links to the wide-area network and at least two communications links to the data center, wherein the regional network includes a security server for providing security to the connections between the wide-area network and the data center;
   wherein, using the communication protocols of the wide-area network, the user interface is able to operate a first application executing on a first application server; and
   wherein the extreme server maintains a second application executing on a second application server in a state-compatible condition to be used in the event that the user interface is no longer able to operate the first application.

2. The system of claim 1, wherein the user interface is provided by a computing device.

3. The system of claim 1, wherein the screen scraper, responsive to a request for execution of the first application by the user interface, forwards the request to both the first application and the second application, with the second application corresponding to the first application.

4. The system of claim 3, wherein the second application on the second application server is identical to the first application on the first application server.

5. The system of claim 3, wherein the first and second applications share common operations with respect to inputs from the user interface.

6. The system of claim 1, wherein the regional network includes a high-speed Internet protocol network for connecting the data center to the Internet.

7. The system of claim 1, wherein the regional network, using the communication links, provides redundancy in connections between the wide-area network and the data center.

8. A fault-tolerant, state-compatible computing system, comprising:
   a user interface connected to a wide-area network;
   a data center comprising:
      an extreme server having at least one screen scraper:
      a plurality of application servers capable of running at least one application; and
      a local network having two or more communication links between the extreme server and the application servers;
   a regional network having at least two communication links to the wide-area network and at least two communications links to the data center;
   wherein, using the communication protocols of the wide-area network, the user interface is able to operate a first application executing on a first application server;
   wherein the extreme server maintains a second application executing on a second application server in a state-compatible condition to be used in the event that the user interface is no longer able to operate the first application;
   wherein the data center includes first and second data centers; and
   wherein the regional network includes a load balancing server for balancing operational loads between the first and second data centers.

9. A fault-tolerant, state-compatible computing system, comprising:
   a user interface accessing a first network;
   a data center connected to the first network by a plurality of communication links, comprising:
      an extreme server;
      a plurality of application servers capable of running at least one application; and
      a second network having two or more communication links between the extreme server and the application servers;
   wherein, using the communication protocols of the first network, the user interface is able to operate a first application executing on a first application server;
   wherein the extreme server maintains a second application executing on a second application server in a state-compatible condition to be used in the event that the user interface is no longer able to operate the first application; and
   a regional network for providing redundant connections using the communication links between the user interface and the data center, wherein the regional network includes a security server for providing security to the connections between the wide-area network and the data center.

10. The system of claim 9, wherein the user interface is provided by a computing device.

11. The system of claim 9, wherein the extreme server includes:
   a screen scraper, responsive to a request for execution of the first application by the user interface, for forwarding the request to both the first application and the second application, with the second application corresponding to the first application.

12. The system of claim 11, wherein the second application on the second application server is identical to the first application on the first application server.

13. The system of claim 11, wherein the first and second applications share common operations with respect to inputs from the user interface.

14. A fault-tolerant, state-compatible computing system, comprising:
   a user interface accessing a first network;
   a data center connected to the first network by a plurality of communication links, comprising:
      an extreme server;
      a plurality of application servers capable of running at least one application; and
      a second network having two or more communication links between the extreme server and the application servers; and a regional network for providing redundant connections using the communication links between the user interface and the data center;

wherein, using the communication protocols of the first network, the user interface is able to operate a first application executing on a first application server;

wherein the extreme server maintains a second application executing on a second application server in a state-compatible condition to be used in the event that the user interface is no longer able to operate the first application;

wherein the data center includes first and second data centers; and wherein the regional network includes a load balancing server for balancing operational loads between the first and second data centers.

* * * * *